United States Patent
Zhang (10) Patent No.: US 10,679,321 B2
(45) Date of Patent: Jun. 9, 2020

(54) EFFICIENT RELEASE OF TARGET MEMORY

(71) Applicant: Alibaba Group Holding Limited, George Town (KY)

(72) Inventor: Chong Zhang, Beijing (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 16/121,960

(22) Filed: Sep. 5, 2018

(65) Prior Publication Data

US 2019/0066258 A1 Feb. 28, 2019

Related U.S. Application Data

(63) Continuation-in-part of application No. PCT/CN2017/074621, filed on Feb. 23, 2017.

(30) Foreign Application Priority Data

Mar. 10, 2016 (CN) .......................... 2016 1 0136920

(51) Int. Cl.
*G06T 1/60* (2006.01)
*G06F 12/02* (2006.01)
*G06F 9/451* (2018.01)

(52) U.S. Cl.
CPC .............. *G06T 1/60* (2013.01); *G06F 12/023* (2013.01); *G06F 9/451* (2018.02); *G09G 2360/12* (2013.01)

(58) Field of Classification Search
None
See application file for complete search history.

(56) References Cited

U.S. PATENT DOCUMENTS

| 6,111,585 A * | 8/2000 | Choi ....................... G06T 15/04 345/419 |
| 7,515,293 B2 | 4/2009 | Kizaki |
| 8,874,835 B1* | 10/2014 | Davis .................... G06F 3/0679 711/103 |
| 10,085,016 B1* | 9/2018 | Cismas ............ H04N 19/00569 |
| 2003/0011594 A1* | 1/2003 | Park ........................ G06T 15/40 345/422 |
| 2004/0066530 A1* | 4/2004 | Wu ........................ G06F 3/1205 358/1.15 |
| 2004/0169885 A1 | 9/2004 | Mellor |
| 2006/0083442 A1* | 4/2006 | Loukipoudis ......... G06F 19/321 382/305 |
| 2007/0132772 A1 | 6/2007 | Morphet |

(Continued)

FOREIGN PATENT DOCUMENTS

CN 101226470 7/2008
CN 103077014 5/2013
(Continued)

*Primary Examiner* — Joni Hsu
(74) *Attorney, Agent, or Firm* — Van Pelt, Yi & James LLP (57) ABSTRACT

A method for processing images, including: determining, subsequent to transmitting content of a target image corresponding to a current processing request to a processor, whether the target image is being used by other processing requests; and in response to the determination that the target image is not being used by the other processing requests, releasing memory utilized by the target image at a target memory, the target memory being used to store a copy corresponding to the target image.

18 Claims, 6 Drawing Sheets

(56) References Cited

U.S. PATENT DOCUMENTS

| | | | |
|---|---|---|---|
| 2013/0051478 A1 | 2/2013 | Wu | |
| 2014/0040551 A1* | 2/2014 | Blainey | G06F 12/0833 711/122 |
| 2015/0089028 A1* | 3/2015 | Zheng | H04W 28/00 709/219 |
| 2017/0168758 A1* | 6/2017 | Suzue | G06F 3/122 |

FOREIGN PATENT DOCUMENTS

| | | |
|---|---|---|
| CN | 104267996 | 1/2015 |
| CN | 104423949 | 3/2015 |
| CN | 105354041 | 2/2016 |

* cited by examiner

EFFICIENT RELEASE OF TARGET MEMORY

CROSS REFERENCE TO OTHER APPLICATIONS

This application is a continuation-in-part of and claims priority to International (PCT) Application No. PCT/CN2017/074621 entitled IMAGE PROCESSING METHOD AND DEVICE, AND SMART TERMINAL filed Feb. 23, 2017 which is incorporated herein by reference for all purposes, which claims priority to People's Republic of China Patent Application No. 201610136920.5 entitled AN IMAGE PROCESSING METHOD, DEVICE, AND SMART TERMINAL filed Mar. 10, 2016 which is incorporated herein by reference for all purposes.

FIELD OF THE INVENTION

The present application relates generally to the field of information processing and more particularly, to image processing.

BACKGROUND OF THE INVENTION

The increasing popularity and ubiquity of terminal devices such as mobile phones, tablet computers, laptop computers, personal computers, wearable devices, in-vehicle devices, and Internet of Things (IoT) devices (e.g., smart appliances, etc.) has led to improved ease for users to interact with such terminal devices. At the same time, terminal devices are becoming multiple purpose devices, capable of providing users with a variety of applications (APPs) such as Web Browsers, messaging programs, mobile payment programs, social media programs, home automation programs, media players, game players, navigation guidance, and the like. Typically, user interfaces (UIs) play an important role in human-machine interactions driven by application programs. For example, such UIs can be a graphical user interface (GUI), a touchless user interface (e.g., gesture-based user interface, etc.), and the like.

Unsurprisingly, there has been an increasing popularity for applications to employ graphics or animations so that more appealing and interactive user interfaces can be provided to engage users at terminal devices on which the applications execute. As a result, oftentimes a large amount of pictures or images is processed for the purpose of configuring and/or rendering UIs at a terminal device. For example, a locally stored image (e.g., a camera captured photo, an image downloaded from the internet, etc.) can be configured and rendered as a wallpaper of a home page or a desktop, a background of an application, an icon representing a corresponding application, and the like.

According to conventional techniques, a locally stored image is processed to be included as part of a UI by the following steps. First, the image is loaded into a first memory, and converted into image content (e.g., image components) based on the image format specified therefor. Next, the converted image is loaded into a second memory of a processor, e.g., a graphic processor, for processing. Then, the image is processed by the processor accordingly based on the image content loaded in the second memory, the result of which is outputted to a terminal device. Finally, upon the application corresponding to the image exiting from its execution, all the memories utilized by the application are released.

As such, when all the memories utilized by the aforedescribed application are released, if the same image is loaded repeatedly from a local storage, the step of loading the image content data into the first memory can be skipped. Nevertheless, with a terminal device being able to process an increasingly large amount of images, the use of both the first memory and the second memory takes up an increasingly large amount of system memory, impacting the overall system functionality in a negative manner.

For example, for terminal devices equipped with a relatively limited amount of memory (e.g., system memory of 1 G or 512 M), the above-described negative impact is more pronounced with regard to the performance and functionalities of the terminal devices. For instance, in some extreme cases, such negative impact might cause a freeze effect on the terminal device, e.g., applications other than the one corresponding to the image are not able to be launched by the user of the terminal device due to a low amount of system memory available.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for image processing are described herein. After the image content (e.g., image components) of a target image corresponding to a current processing request is transmitted to a processor (e.g., a graphics processor), a target memory occupied by the target image is released. Here, the target memory is used to store a copy of the target image in memory. As such, through the release of the target memory storing the target image, regardless of whether the current application that had requested the target memory has been closed/exited, the system memory can be more timely released for use by either the current application employing the target image, or other applications in general. As a result, the required usage of memory incurred by image processing is reduced, thereby increasing the efficiency of memory usage, enhancing the overall performance and functionality of a terminal device.

In particular, the above-described release of the target memory especially benefits terminal devices equipped with a relatively limited amount of memory (e.g., terminal devices having system memory of 1 G or 512 M or less). In this scenario, the release of the target memory further improves the system performance and functionality of such terminal devices when operating under overloading conditions.

Furthermore, the afore-described target memory can also be released when it is determined that the corresponding target image is not currently being used by other processing requests. Here, the status that the target image is not being used by other processing requests is used to indicate that the copy in memory corresponding to the target image is not currently used by other processing requests. As such, repeated loading of the target image into memory from handling other processing requests can be avoided, thereby reducing the system memory load, and increasing the efficiency of system memory usage, without affecting the efficiency of image processing.

In general, graphics processors only recognize converted image content (e.g., texture content, etc.), unable to recognize the copies in memory (e.g., a first memory) corresponding to the images under processing. In other words, graphics processors do not need to access copies of images in the first memory.

Therefore, during the execution of an application using a target image, a target memory corresponding to a copy of the target image stored in memory can be released and become available for use by other applications or processes. In particular, after the content of the target image corresponding to a current processing request is transmitted to a graphics processor, the target memory corresponding to the target image is released. The target memory is configured to store a copy of the target image in memory. For example, when a target image of the type TIF, and of the size of 1024×768×4 bytes, is set as a desktop background, a total of 3,145,728 bytes of a target memory is required. According to various embodiments of the present disclosure, the target memory is released during the course of the execution of the application corresponding to the target image (e.g., a desktop display program), thereby greatly reducing the demand on system memory, and increasing the efficiency of memory usage by freeing up the target memory as soon as the target image that it stores is no longer needed by application(s).

Figure 1A:
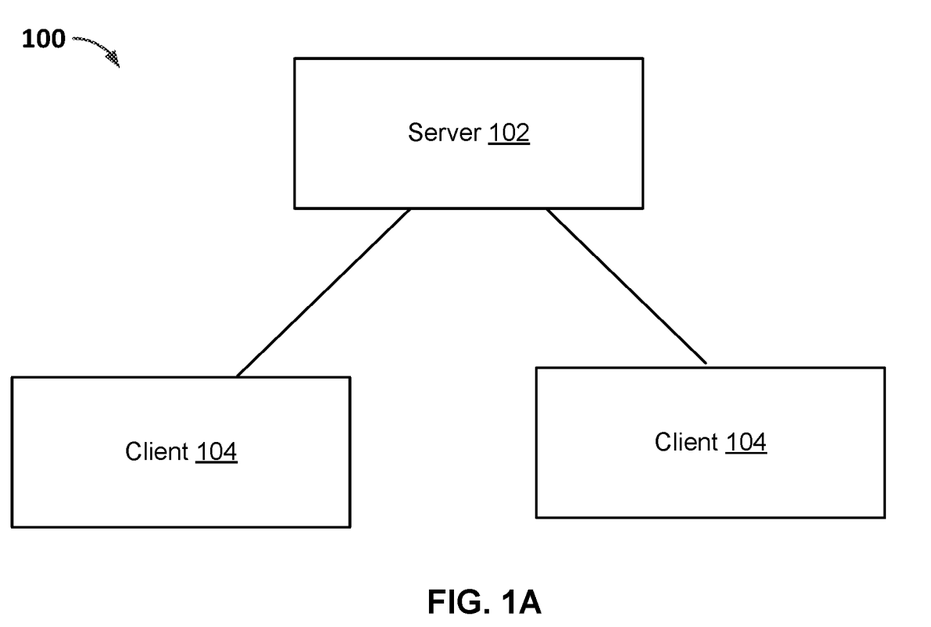
FIG. 1A is a schematic diagram illustrating an example environment of an example process for image processing, in accordance with one or more embodiments of the present disclosure.

FIG. 1A illustrates an example environment for image processing in accordance with an embodiment of the present disclosure. System 100 includes a server 102 and a plurality of clients 104. In some embodiments, clients 104 and server 102 are in data communication with each other via networks such as a wired network, wireless network, etc. In some embodiments, clients 104 and server 102 are executing on the same terminal device (e.g., smart phone, etc.), and communicate via inter-process communication (IPC) protocols. In some embodiments, clients 104 and server 102 are executing in the same process on a terminal device, and communicate via inter-thread communication protocols. For example, clients 104 can be configured at a graphical user interface (GUI) thread of an application. It should be understood that any suitable techniques can be applied herein to the data communication between server 102 and clients 104, without limitation.

According to various embodiments of the present disclosure, the afore-mentioned terminal device includes, for example, a smart phone, a tablet computer, an e-book reader, an MP3 (Moving Picture Experts Group Audio Layer III) player, an MP4 (Moving Picture Experts Group Audio Layer IV) player, a laptop computer, an in-vehicle device, a desktop computer, a set-top box, a smart TV, a wearable device, an IoT device, and the like.

Figure 1B:
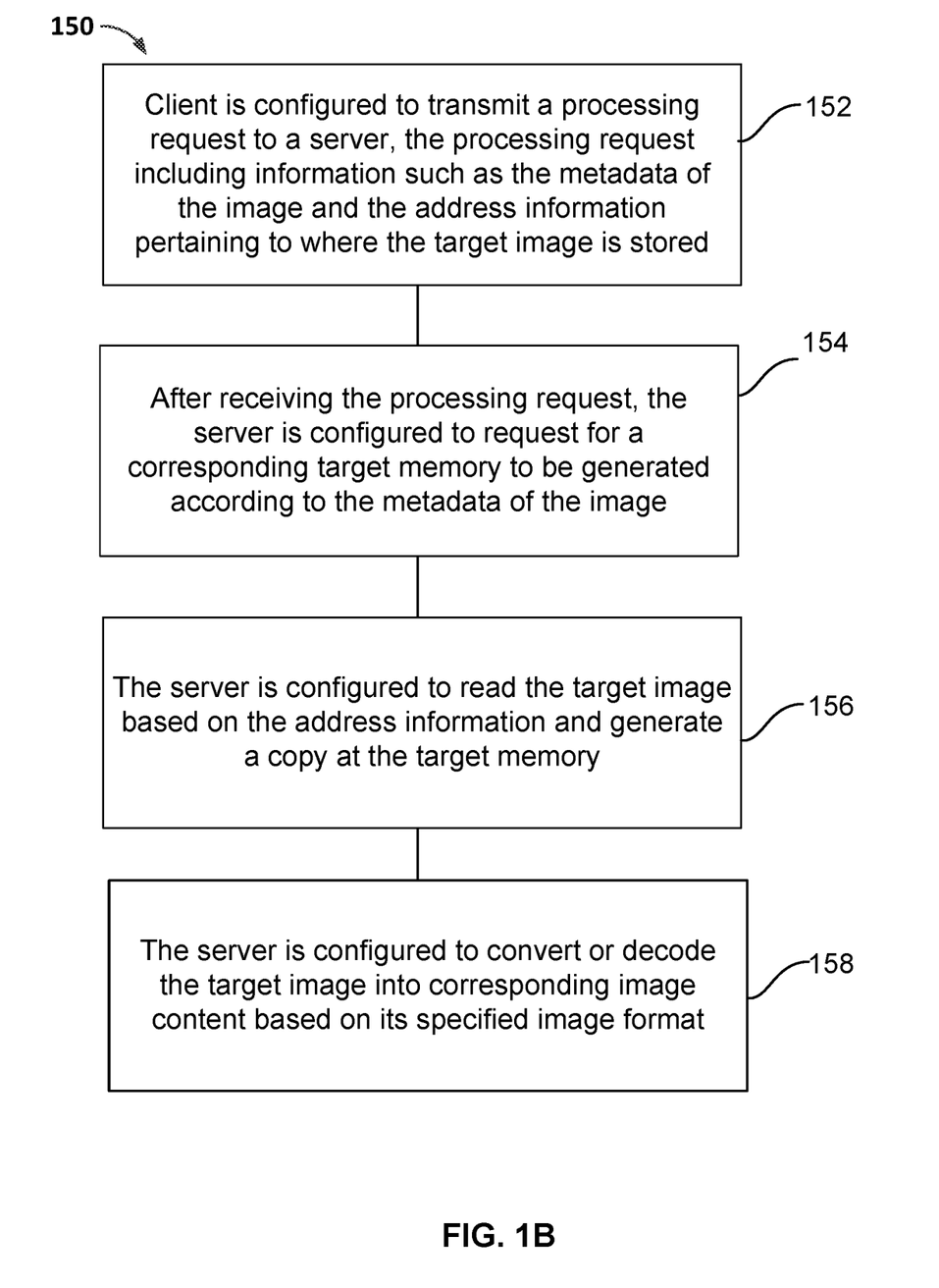
FIG. 1B is a schematic diagram illustrating an example process for image processing, in accordance with one or more embodiments of the present disclosure.

FIG. 1B illustrates an example process for image processing in accordance with an embodiment of the present disclosure. Process 150 can implement the data communication between clients 104 and server 102 of FIG. 1A.

Process 150 starts at 152, where client 104 is configured to transmit a processing request to server 102, the processing request including information such as the metadata of the image (e.g., the size, the color depth, shutter speed, the number of bits per pixel, etc.) and the address information pertaining to where the target image is stored.

At 154, after receiving the above-described processing request, server 102 is configured to request for a corresponding target memory to be generated according to the above-described metadata of the image.

In some embodiments, the target memory is configured to include an image container. A container refers to a common design choice in terms of defining image objects used by computer software. As used herein, a container is configured to represent an image object that encapsulates a copy stored in memory corresponding to the target image, as well as properties of the target image. In particular, when a container is deleted from memory, any data included therein that is not saved in a data storage (e.g., a file system, etc.) is deleted along with the container from the memory.

At 156, server 102 is configured to read the target image based on the above-described address information and generate a copy at the target memory.

At 158, server 102 is configured to convert or decode the target image into corresponding image content based on its specified image format such as JPEG, GIF, PNG, BMP, WBMP, and the like. The format of a file can be determined based on, for example, file extensions associated with the image files containing the image content.

In some embodiments, server 102 is configured to generate a texture assembler and use the texture assembler to convert the target image into the corresponding texture content. Image texture content is part of image processing that quantifies the perceived texture of an image. For example, image texture content indicates information pertaining to the spatial arrangement of color or intensities in an image or selected region of an image. It should be understood that any suitable techniques can be applied herein to converting the target image to corresponding image content, without limitation.

First, server 102 is configured to transmit the converted image content to a graphics processor. As used herein, a graphics processor (e.g., GPU) refers to a specialized electronic circuit designed to rapidly manipulate and alter memory to accelerate the creation of images in a frame buffer intended for output to a display device. Graphics processors can be used in embedded systems, mobile phones, personal computers, workstations, game consoles, and the like. The graphics processor can be implemented separately from a CPU, or on a CPU.

Next, after the converted image content is successfully transmitted to the graphics processor, server 102 is configured to release the afore-described target memory.

Afterwards, server 102 is configured to signal the graphics processor to process the target image content and transmit the corresponding processing results to a terminal device.

In some embodiments, the processing of the target image content by the graphics processor includes rendering the image content to generate corresponding rendering results. It should be understood that any suitable techniques can be applied herein to processing the target image content, without limitation.

According to various embodiments of the present disclosure, the above-described target memory is released during the execution of the application corresponding to the target image. As such, more memory space becomes available at an earlier point of time (e.g., prior to the conclusion of the execution of the application corresponding to the target image), reducing the load on system memory, and increasing the efficiency of memory usage. In particular, for terminal devices equipped with a relatively limited amount of system memory (e.g., terminal devices with system memory of 1 G or 512 M or less), the system performance and functionality is greatly improved when operating under overloaded conditions.

Figure 2:
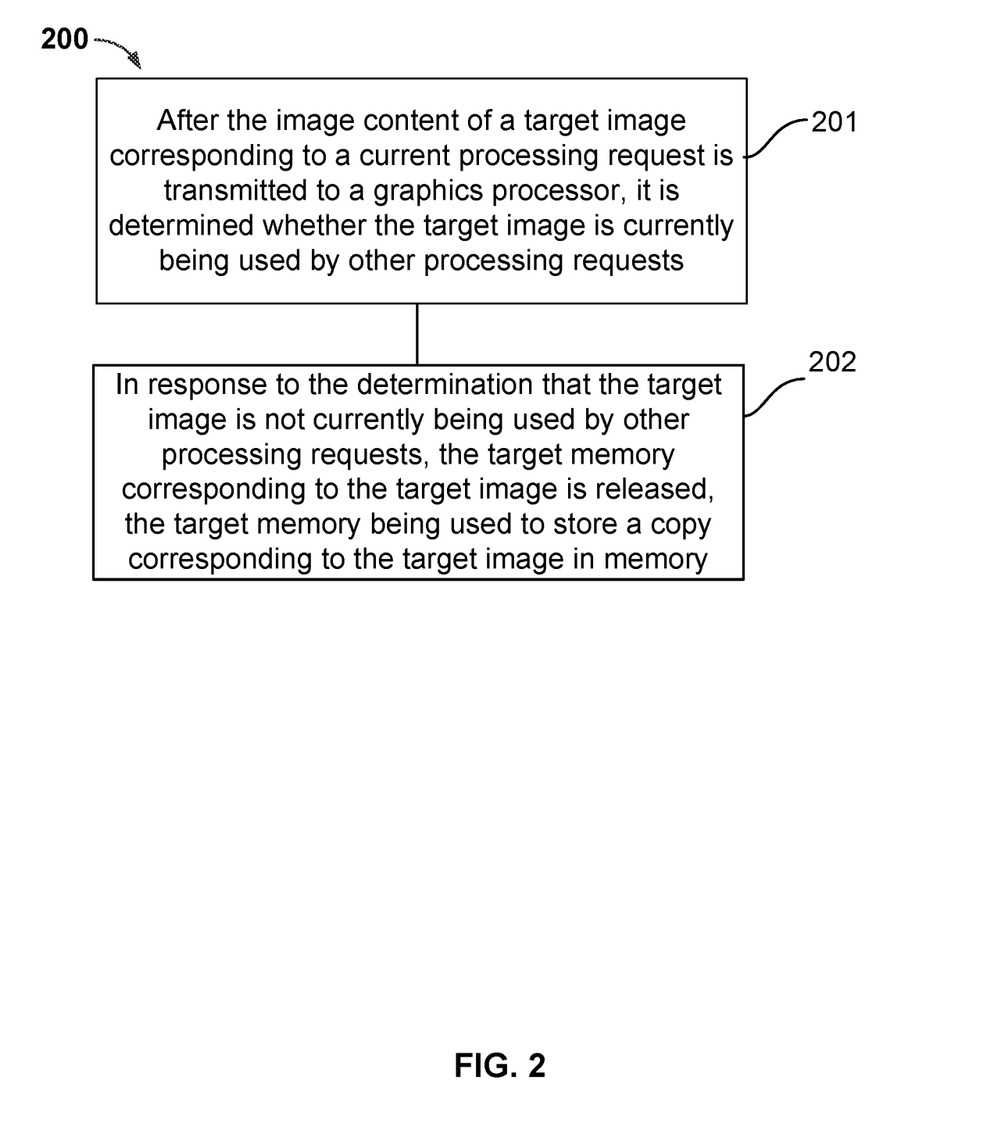
FIG. 2 is a flowchart illustrating an example process for image processing, in accordance with one or more embodiments of the present disclosure.

FIG. 2 illustrates a flowchart of an example process for image processing in accordance with an embodiment of the present disclosure. Process 200 can be implemented by, for example, system 500 of FIG. 5.

Process 200 starts at 201, where after the image content of a target image corresponding to a current processing request is transmitted to a graphics processor, it is determined whether the target image is currently being used by other processing requests. More details are described below.

At 202, in response to the determination that the target mage is not currently being used by other processing requests, the target memory corresponding to the target image is released. Here, the target memory is used to store a copy corresponding to the target image in memory.

In some embodiments, the status that the target image is currently being used by other processing requests is configured to indicate that the corresponding copy in memory is currently being accessed by other processing requests. In this case, when the target image is still being used by other processing requests, if the above-described target memory is released, the target image needs to be reloaded into memory (e.g., generating another copy in memory) at the target memory in order to handle other processing requests. The repeated loading of the target image in memory leads to an elongated amount of time to process images, and decreased efficiency of image processing. Therefore, it is when the target image is not currently being used by other processing requests that the target memory corresponding to the target image is released. As a result, the demand of system memory is decreased without affecting the efficiency of image processing, and the efficiency of memory usage is increased.

According to various embodiments of the present disclosure, two example mechanisms for determining whether a target image is currently being used by other processing requests are illustrated below. It should be understood that any suitable techniques can be applied herein to the determination without limitation.

In the first example, the number of times the target image is being used by processing requests is used to determine whether the target image is currently being used by other processing requests. In implementations, when the number of times is a pre-configured first value, it is determined that the target image is not currently being used by other processing requests. For example, the pre-configured first value is zero.

In some embodiments, the number of times the target image is used by processing requests can be determined by use of an identifier associated with the target memory. As described in more detail below, a mapping between identifiers associated with respective target memories and the numbers of times corresponding target images are used by processing requests is established. By search the mapping using the identifier associated with the target memory, the number of times the respective target image is used by requesting processes is obtained. With such a mapping, it is faster to retrieve the number of times the target image is used by processing requests.

In implementations, a random number is assigned to the image container of a target image, the random number serving as the identifier (ID) of the image container. Next, the image container ID is mapped to the number of times the target image is used by processing requests, thereby generating a mapping relationship between the target memory identifier and the number of times the target image is used by processing requests.

The number of times the target image is used by processing requests can be updated afterwards. Two example updating mechanisms are illustrated below, and it should be understood that any suitable techniques can be applied herein to updating the afore-described number of times the target image is used by processing requests, without limitation.

In the first example, when the target image is to be used by a current processing request, the number of times the target image is used by the processing request is recorded. Then, after the target image content corresponding to the target image associated with the current processing request is successfully transmitted to a graphics processor, the number of times the target image is used by processing requests is reduced by a pre-configured amount.

In some embodiments, a variable is configured corresponding to the number of times the target image is used by processing requests. For example, the variable can initially be set to a default value (e.g., zero). Subsequently, after receiving the current processing request that involves the target image, it is indicated that the target image is being used by a processing request. Consequently, the corresponding variable is updated by increasing the initial value by a pre-configured amount (e.g., 1). Likewise, after the target image content corresponding to the target image associated with the processing request is successfully transmitted to the graphics processor, it is indicated that the processing request has been handled to the extent that a copy in memory corresponding to the target image is no longer needed for the purposes of processing the request. As this point, the corresponding variable is updated by decreasing the value by a pre-configured amount (e.g., 1).

In some embodiments, for the processing request received, information such as the address information included in the processing request can be matched to the address information associated with the afore-described variable to obtain the variable corresponding to the current processing request. It should be understood that any suitable techniques can be applied herein to the obtaining of the afore-described variable associated with the processing request, without limitation.

Here, for simplicity of illustration, the afore-described first pre-configured default value is set as zero. In implementation, the first pre-configured default value can also be set as a non-zero value. In either case, as long as the afore-described variable is the same as the first pre-configured default value, it is determined that the target image is not currently used by other processing requests. It should be understood that any suitable techniques can be applied herein to the presentation of the number of times the target image is being used by other processing requests, without limitation.

Further, the afore-described pre-configured amount is configured to indicate the amount of change in value caused by one processing request. For example, the pre-configured amount can be set as 1, 2, etc. It should be understood that any number can be applied herein as the pre-configured amount, without limitation.

In the second example, in response to a received processing request corresponding to the target image, it is determined whether a unique identifier is present in a collection of identifiers. If it is determined that the identifier is not present, the identifier is added to the collection of identifiers, and the number of times the identifier appears is compared to a pre-configured second value. Here, the unique identifier is generated based on the target image associated with the current processing request, different target images corresponding to different unique identifiers.

In some embodiments, the difference between the pre-configured first value and the pre-configured second value can be set as the above-described pre-configured amount. It should be understood that the value associated with the pre-configured first value, the pre-configured second value, and the pre-configured amount can be any value without limitation.

Next, for the received current processing request, when it is determined that its corresponding unique identifier is present in the collection of identifiers, the number of times the unique identifier has appeared is increased by a pre-configured amount. The increased number is set as the number of time the corresponding target image is being used by processing requests.

Lastly, after the image content of the target image corresponding to the current processing request is successfully transmitted to the graphics processor, the number of times the afore-described unique identifier appears is decreased by a pre-configured amount.

In implementations, a unique identifier is generated based on the information pertaining to the target image associated with the received current processing request. Again, different target images correspond to different unique identifiers, and different instances of the same target image corresponds to the same unique identifier. As such, the number of times the target image is used by processing requests can be updated based on the uniqueness of those identifiers.

In some embodiments, a GUID (globally unique identifier) or other techniques alike are used to generate the afore-described unique identifiers. It should be understood that any suitable techniques can be applied herein to generating unique identifiers, without limitation.

In some embodiments, the updating of the number of times a target image is used by processing requests includes the following steps. It should be understood that any suitable techniques can be applied herein to presenting and updating the number of time a target image being used by processing requests, without limitation.

First, during the initialization stage, a server is configured to generate a collection of identifiers, and an ID generator. The ID generator is configured to generate unique identifiers for all the clients.

Second, a client is configured to transmit the information pertaining to a target image to the ID generator, which in turn is configured to generate a corresponding unique identifier based on the information pertaining to the target image.

Third, the client is configured to transmit a processing request to the server, the processing request including the unique identifier corresponding to the target image.

Fourth, the server is configured to determine whether the unique identifier corresponding to the received current processing request is present in the collection of identifiers.

Fifth, if it is determined that the unique identifier is not present in the collection of identifiers, the unique identifier is added to the collection of identifiers, and the number of times the unique identifier appears is updated to a pre-configured second value.

Sixth, if it is determined that the unique identifier is present in the collection of identifiers, the number of times the unique identifier appears is increased by a pre-configured amount.

Seventh, after the image content of the target image corresponding to the current processing request being successfully transmitted to the graphics processor, the number of times the corresponding unique identifier appears is decreased by a pre-configured amount.

Referring back to the examples of determining whether a target image is currently being used by other processing requests, in the second example, a pre-configured indicator associated with the target image is used to determine whether the corresponding target image is currently being used by other processing requests.

In some embodiments, a pre-configured indicator is assigned to the corresponding target image which meets one or more pre-configured qualifying conditions. For example, a pre-configured qualifying condition can specify a qualified image as one that is used by only one application, and used only once during the entire life cycle of such application. For instance, after a terminal device is powered on, a desktop displaying program usually is configured to process the request of setting a target image as the background only once. As such, the target image corresponding to the background of the desktop display of the terminal device qualifies as an image that is used only by one application (e.g., the desktop display program), and used only once by such application during the entire life cycle thereof.

In some other embodiments, the developers of an application can specify corresponding pre-configured indicators for images uploaded for the application so that a user of the application can identify qualifying images based on the pre-configured indicators. It should be understood that any suitable techniques can be applied herein to the generating of pre-configured indicators without limitation.

Figure 3:
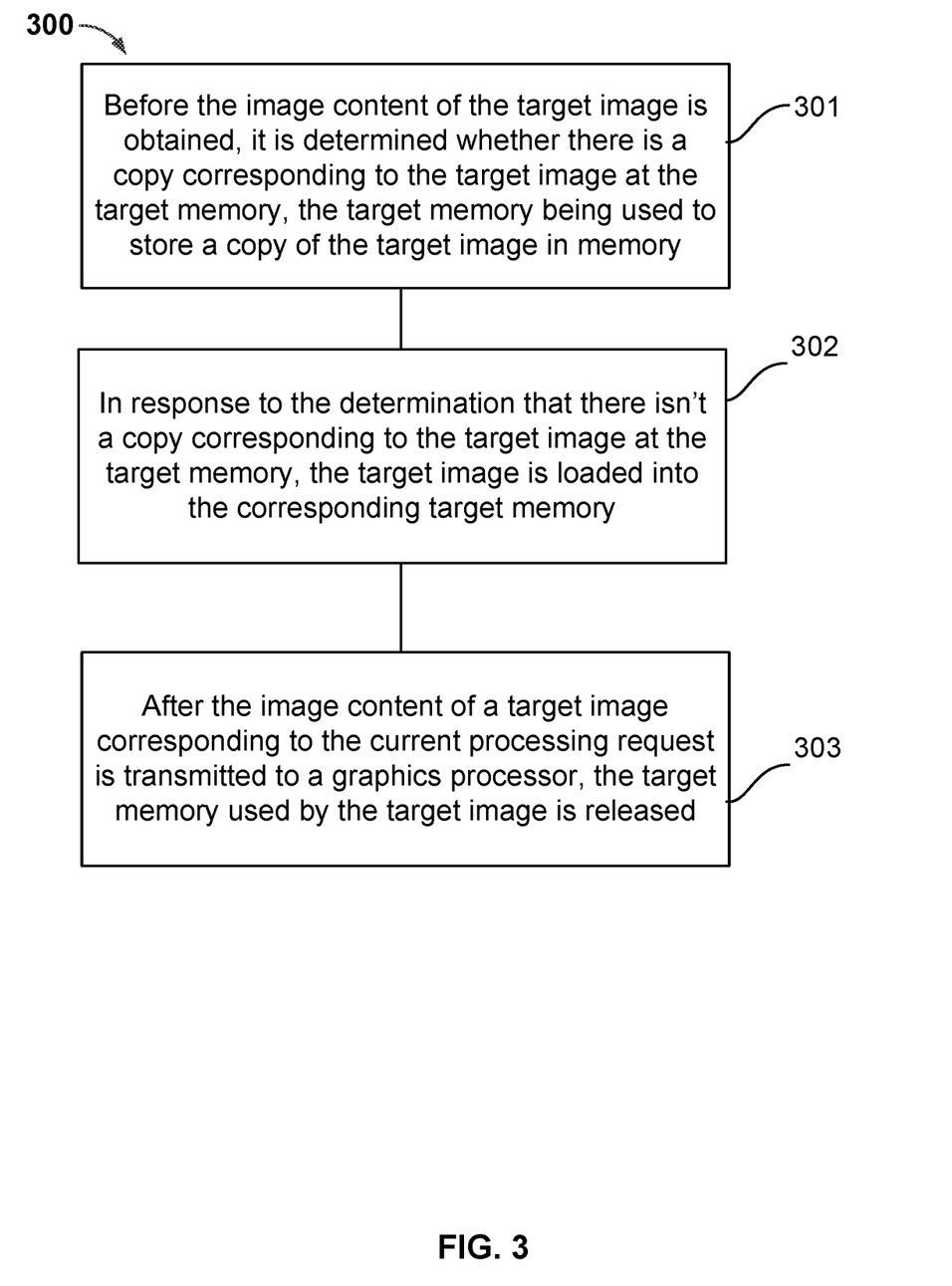
FIG. 3 is a flowchart illustrating another example process for image processing, in accordance with one or more embodiments of the present disclosure.

FIG. 3 illustrates a flowchart of another example process for image processing, in accordance with an embodiment of the present disclosure. Process 300 can be implemented by, for example, system 500 of FIG. 5.

Process 300 starts at 301, where, before the image content of the target image is obtained, it is determined whether there is a copy corresponding to the target image at the target memory corresponding to the target image. Here, the target memory is configured to store a copy of the target image in memory.

At 302, when it is determined that there isn't a copy corresponding to the target image at the target memory, the target image is loaded into the corresponding target memory.

At 303, after the image content of the target image corresponding to the current processing request is transmitted to the graphics processor, the target memory used by the target image is released.

In some embodiments, the process of obtaining the image content of the target image includes reading the data from the copy of the target image at the target memory. Based on the data read from the target memory, image content such as texture content is generated by use of software tools such as a texture assembler.

In some scenarios, multiple clients compete to access the server, or an application incurs an abnormal exit from execution. In both cases, those abnormal operations result in abnormal release of the copy of the target image from the target memory. As a result, the copy in memory corresponding to the target image can no longer be read properly from the target memory, causing errors in image processing.

According to various embodiments of the present disclosure, the afore-described scenarios can be addressed by determining whether there is a copy in memory corresponding to the target image at the target memory, before the image content is obtained for the target image. In response to the determination that there isn't a copy in memory corresponding to the target image at the target memory, the target image is loaded again into the corresponding target memory so that image content can be generated based on the copy in memory. As a result, the robustness and stability of image processing is improved.

In some embodiments, before the texture assembler is used to generate texture content for the target image, it is determined whether an image container corresponding to the target image includes a copy corresponding to the target image. For example, by use of an identifier (ID) of the image container, the content written in the container can be read. If the read result indicates empty, or scrambled content, it is determined that the copy corresponding to the target image is not present in the image container. As a result, the target image is reloaded to the corresponding image container, and then the texture assembler is generated again and used to generate the texture content based on the image data included in the container. If the read result indicates that the content is valid, the texture assembler is in turn created for generating corresponding texture content based on the read content.

In some embodiments, in response to the determination that the copy corresponding to the target image is not present at the target memory, it is determined whether an identifier associated with the target memory, and/or the current processing request meets pre-configured one or more conditions. If it is determined that the identifier associated with the target memory, and/or the current processing request meets the pre-configured one or more conditions, the target image is reloaded to the corresponding target memory.

In some embodiments, the afore-mentioned pre-configured one or more conditions are configured to assess the legitimacy of the identifier of the target memory, and/or the current processing request. For example, a first pre-configured condition can specify whether the identifier of the target memory is legitimate; the second pre-configured condition can specify whether the identifier associated with the originator of the current processing request is legitimate. When both the identifier associated with the target memory and the identifier associated with the current processing requests are determined as legitimate, it is determined that the current processing request is legitimate, and the current processing request will be processed accordingly. When either the identifier associated with the target memory or the identifier associated with the current processing requests is determined as illegitimate, it is determined that the current processing request is illegitimate, and the current processing request will be discarded accordingly.

Figure 4:
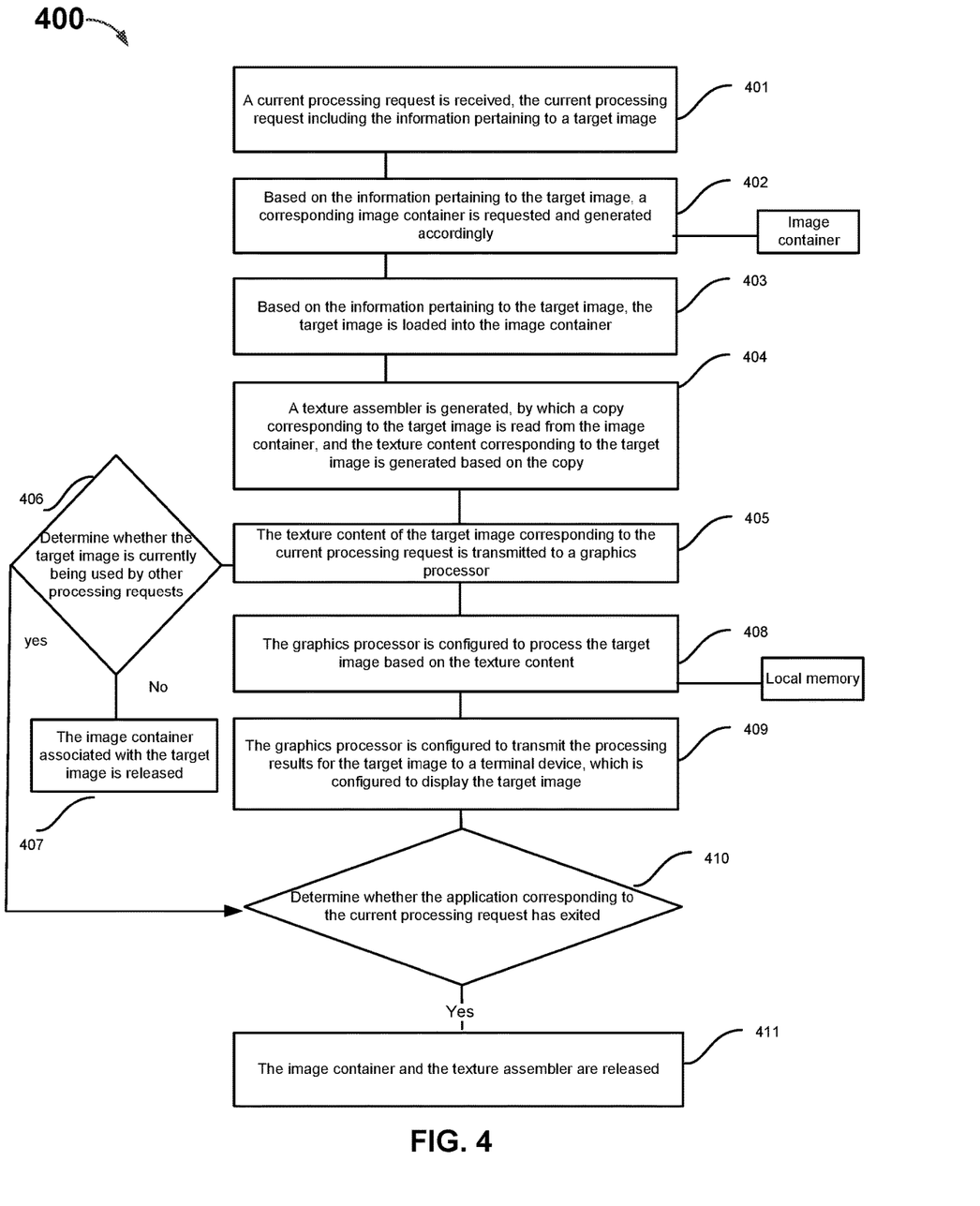
FIG. 4 is a flowchart illustrating yet another example process for image processing, in accordance with one or more embodiments of the present disclosure.

FIG. 4 illustrates a flowchart of yet another example process for image processing, in accordance with an embodiment of the present disclosure. Process 400 can be implemented by, for example, system 500 of FIG. 5.

Process 400 starts at 401, where a current processing request is received, the processing request including the information pertaining to a target image.

At 402, based on the information pertaining to the target image, a corresponding image container is requested and generated accordingly. In this example, the target image and the image container have an one-to-one relationship.

At 403, based on the information pertaining to the target image, the target image is loaded into the image container.

At 404, a texture assembler is generated, by which a copy corresponding to the target image is read from the image container, and the texture content corresponding to the target image is generated based on the copy.

At 405, the texture content of the target image corresponding to the current processing request is transmitted to a graphics processor.

At 406, after the texture content of the target image corresponding to the current processing request is successfully transmitted to the graphics processor, it is determined whether the target image is currently being used by other processing requests. If not, process 400 continues to 407. If so, in some embodiments, process 400 continues to 410.

At 407, when it is determined that the target image is not currently being used by other processing requests, the image container associated with the target image is released. As such, by releasing the image container from the memory in response to a determination that the target image is not currently being used by other processing requests, it is possible to release the image container prior to the closing or exit from the application that had generated the current processing request for the target image.

At 408, the graphics processor is configured to process the target image based on the texture content stored in a local memory thereof.

At 409, the graphics processor is configured to transmit processing results for the target image to a terminal device, which is configured to display the target image thereon.

At 410, it is determined whether the application corresponding to the current processing request has exited. If so, process 400 continues to 411. In various embodiments, based on whether the main thread corresponding to the application has exited, whether there has been a command from the user to exit the application, or the like, it is determined whether the application corresponding to the current processing request has exited.

At 411, the image container and the texture assembler are released. In some embodiments, the memories used by the texture assembler are released.

When at 406 it is determined that the target image is currently being used by other processing requests, process 400 releases the image content upon the application corresponding to the current processing request exits its execution.

Figure 5:
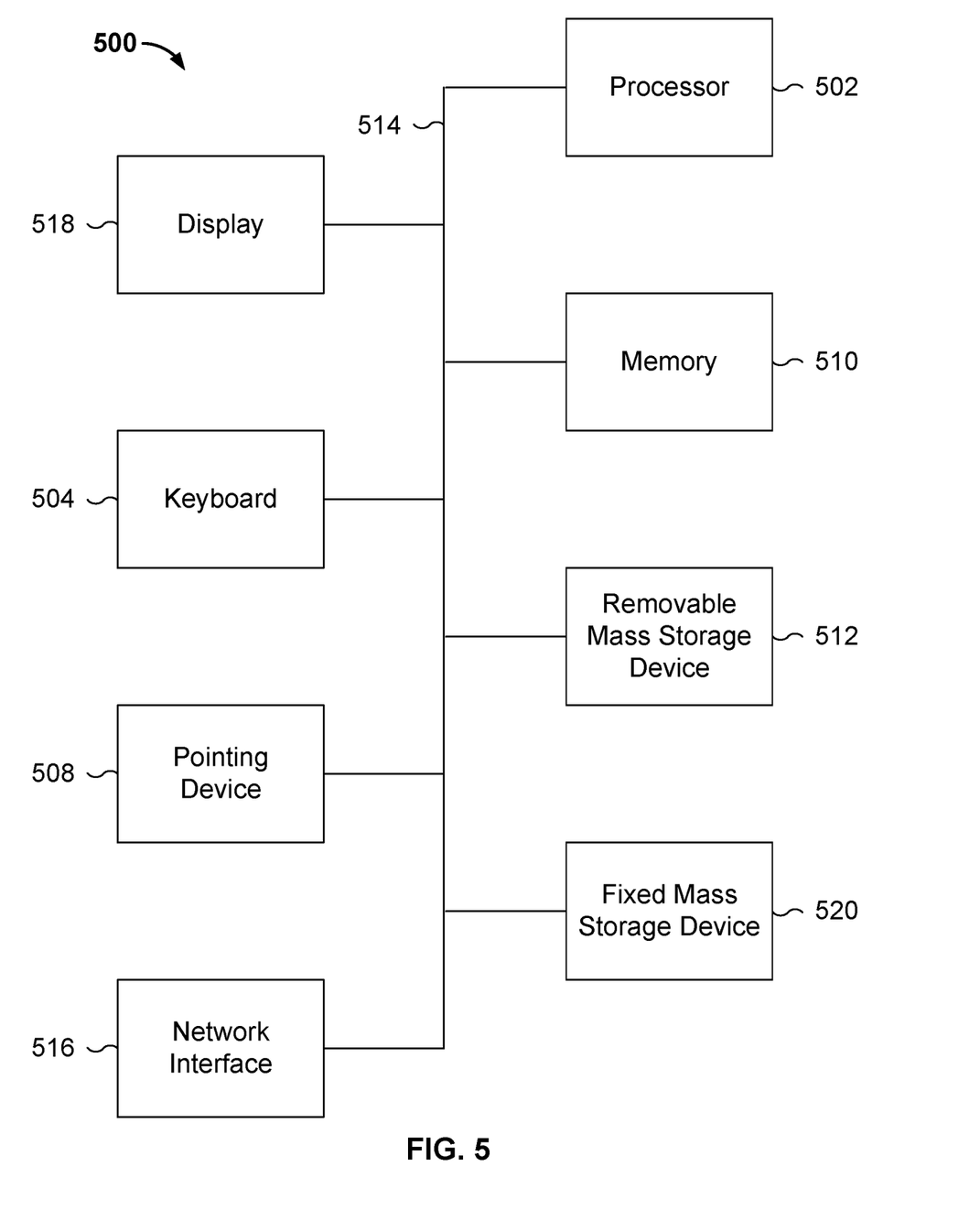
FIG. 5 is a block diagram illustrating an example programmed computed system for processing images, in accordance with one or more embodiments of the present disclosure.

FIG. 5 is a functional diagram illustrating an embodiment of a programmed computer system for image processing. As will be apparent, other computer system architectures and configurations can be used to process images. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518). In some embodiments, processor 502 includes and/or is used to provide the image processing.

Processor 502 is coupled bi-directionally with memory 510, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer readable storage media, described below, depending on whether, for example, data access needs to be bi-directional or uni-directional. For example, processor 502 can also directly and very rapidly retrieve and store frequently needed data in a cache memory (not shown).

A removable mass storage device 512 provides additional data storage capacity for the computer system 500 and is coupled either bi-directionally (read/write) or uni-directionally (read only) to processor 502. For example, storage 512 can also include computer readable media such as magnetic tape, flash memory, PC-CARDS, portable mass storage devices, holographic storage devices, and other storage devices. A fixed mass storage 520 can also, for example, provide additional data storage capacity. The most common example of fixed mass storage 520 is a hard disk drive. Mass storages 512, 520 generally store additional programming instructions, data, and the like that typically are not in active use by the processor 502. It will be appreciated that the information retained within mass storages 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display 518, a network interface 516, a keyboard 504, and a pointing device 508, as well as an auxiliary input/output device interface, a sound card, speakers, and other subsystems as needed. For example, the pointing device 508 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers. Persons skilled in the art may clearly understand that, for the sake of descriptive convenience and streamlining, one may refer to the processes in the aforesaid method embodiments that correspond to specific work processes of the systems, devices, and units described above. They will not be discussed further here.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media, (transitory media), such as modulated data signals and carrier waves.

A person skilled in the art should understand that embodiments of the present application can be provided as methods, systems, or computer program products. Therefore, the present application can take the form of an entirely hardware embodiment, an entirely software embodiment, or an embodiment that combines software and hardware aspects. In addition, the present application can take the form of computer program products implemented on one or more computer-operable storage media (including but not limited to magnetic disk storage devices, CD-ROMs, and optical storage devices) containing computer operable program codes.

The present application is described with reference to flowcharts and/or block diagrams based on methods, devices (systems), and computer program products of embodiments of the present application. Please note that each process and/or block within the flowcharts and/or block diagrams and combinations of processes and/or blocks within the flowcharts and/or block diagrams can be realized by computer commands. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command devices. These command devices implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

Although preferred embodiments of the present application have already been described, persons skilled in the art can make other alterations and modifications to these embodiments once they grasp the basic creative concept. Therefore, the attached claims are to be interpreted as including the preferred embodiments as well as all alterations and modifications falling within the scope of the present application.

Obviously, a person skilled in the art can modify and vary the present application without departing from the spirit and scope of the present application. Thus, if these modifications to and variations of embodiments of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing images, comprising:
   in response to receiving a current processing request corresponding to a target image, determining whether a unique identifier corresponding to the target image is present in a collection of identifiers, wherein the unique identifier is generated based at least in part on the target image and different target images correspond to different unique identifiers, wherein the current processing request corresponds to a request by a current application of the target image;
   in response to a determination that the unique identifier is not present in the collection of identifiers, adding the unique identifier to the collection of identifiers;
   updating an appearance times of the unique identifier to a first pre-configured value;
   in response to a determination that content of the target image has been successfully transmitted to a processor, decreasing the appearance times of the unique identifier by a pre-configured amount;
   determining whether the target image is being used by other processing requests using the appearance times of the unique identifier corresponding to the target image;
   in response to a determination that the appearance times of the unique identifier is a second pre-configured value, determining that the target image is not currently being used by the other processing requests; and
   in response to the determination that the target image is not being used by the other processing requests, releasing memory utilized by the target image at a target memory regardless of whether or not execution of the current application has ended, the target memory being used to store a copy corresponding to the target image.

2. The method of claim 1, wherein the pre-configured amount is a first pre-configured amount, further comprising updating a number of times the target image is being used by:
   recording, when the target image is being used by the current processing request, the number of times the target image is being used; and
   decreasing, subsequent to the content of the target image corresponding to the current processing request being successfully transmitted to the processor, the number of times the target image is being used by a second pre-configured amount.

3. The method of claim 1, further comprising updating a number of times the target image is being used by:
   in response to a determination that the unique identifier is present in the collection of identifiers, increasing the appearance times of the unique identifier by the pre-configured amount;
   setting the appearance times of the unique identifier as the number of times the target image is being used; and
   decreasing the appearance times of the unique identifier by the pre-configured amount after the content of the target image corresponding to the current processing request is transmitted successfully to the processor.

4. The method of claim 1, wherein the determining of whether the target image is currently being used by the other processing requests further comprises:

determining whether there is a pre-configured indicator associated with the target image; and in response to the determination that there is the pre-configured indicator associated with the target image, determining that the target image is not currently being used by the other processing requests.

5. The method of claim 1, further comprising:

determining, before obtaining the content of the target image, whether the copy corresponding to the target image is present at the target memory utilized by the target image; and in response to the determination that the copy corresponding to the target image is not present at the target memory, loading the target image into the target memory.

6. The method of claim 1, further comprising:

determining, before obtaining the content of the target image, whether the copy corresponding to the target image is present at the target memory utilized by the target image;

determining, in response to the determination that the copy corresponding to the target image is not present at the target memory, whether an identifier of the target memory, and/or the current processing request meets one or more pre-configured conditions; and in response to the determination that the identifier of the target memory and/or the current processing request meets the one or more pre-configured conditions, loading the target image into the target memory.

7. A system, comprising:

one or more processors configured to:

in response to receiving a current processing request corresponding to a target image, determine whether a unique identifier corresponding to the target image is present in a collection of identifiers, wherein the unique identifier is generated based at least in part on the target image and different target images correspond to different unique identifiers, wherein the current processing request corresponds to a request by a current application of the target image;

in response to a determination that the unique identifier is not present in the collection of identifiers, add the unique identifier to the collection of identifiers;

update an appearance times of the unique identifier to a first pre-configured value;

in response to a determination that content of the target image has been successfully transmitted to another processor, decrease the appearance times of the unique identifier by a pre-configured amount;

determine whether the target image is being used by other processing requests using the appearance times of the unique identifier corresponding to the target image;

in response to a determination that the appearance times of the unique identifier is a second pre-configured value, determine that the target image is not currently being used by the other processing requests; and in response to the determination that the target image is not being used by the other processing requests, release memory utilized by the target image at a target memory regardless of whether or not execution of the current application has ended, the target memory being used to store a copy corresponding to the target image; and one or more memories coupled to the one or more processors, configured to provide the one or more processors with instructions.

8. The system of claim 7, wherein the pre-configured amount is a first pre-configured amount, wherein the one or more processors are further configured to update a number of times the target image is being used by:

recording, when the target image is being used by the current processing request, the number of times the target image is being used; and decreasing, subsequent to the content of the target image corresponding to the current processing request being successfully transmitted to the processor, the number of times the target image is being used by a second pre-configured amount.

9. The system of claim 7, wherein the one or more processors are further configured to update a number of times the target image is being used by:

in response to a determination that the unique identifier is present in the collection of identifiers, increasing the appearance times of the unique identifier by the pre-configured amount;

setting the appearance times of the unique identifier as the number of times the target image is being used; and decreasing the appearance times of the unique identifier by the pre-configured amount after the content of the target image corresponding to the current processing request is transmitted successfully to the processor.

10. The system of claim 7, wherein to determine whether the target image is currently being used by the other processing requests further comprises to:

determine whether there is a pre-configured indicator associated with the target image; and in response to the determination that there is the pre-configured indicator associated with the target image, determine that the target image is not currently being used by the other processing requests.

11. The system of claim 7, wherein the one or more processors are further configured to:

determine, before obtaining the content of the target image, whether the copy corresponding to the target image is present at the target memory utilized by the target image; and in response to the determination that the copy corresponding to the target image is not present at the target memory, load the target image into the target memory.

12. The system of claim 7, wherein the one or more processors are further configured to:

determine, before obtaining the content of the target image, whether the copy corresponding to the target image is present at the target memory utilized by the target image;

determine, in response to the determination that the copy corresponding to the target image is not present at the target memory, whether an identifier of the target memory and/or the current processing request meets one or more pre-configured conditions; and in response to the determination that the identifier of the target memory and/or the current processing request meets the one or more pre-configured conditions, load the target image into the target memory.

13. A computer program product, the computer program product being embodied in a tangible computer readable storage medium and comprising computer executable instruction, which, when implemented by a computer, cause the computer to perform the steps of:

in response to receiving a current processing request corresponding to a target image, determining whether a unique identifier corresponding to the target image is present in a collection of identifiers, wherein the unique identifier is generated based at least in part on the target image and different target images correspond to different unique identifiers, wherein the current processing request corresponds to a request by a current application of the target image;

in response to a determination that the unique identifier is not present in the collection of identifiers, adding the unique identifier to the collection of identifiers;

updating an appearance times of the unique identifier to a first pre-configured value;

in response to a determination that content of the target image has been successfully transmitted to a processor, decreasing the appearance times of the unique identifier by a pre-configured amount;

determining whether the target image is being used by other processing requests using the appearance times of the unique identifier corresponding to the target image;

in response to a determination that the appearance times of the unique identifier is being used by other processing requests is a second pre-configured value, determining that the target image is not currently being used by the other processing requests; and in response to the determination that the target image is not being used by the other processing requests, releasing memory utilized by the target image at a target memory regardless of whether or not execution of the current application has ended, the target memory being used to store a copy corresponding to the target image.

14. The computer program product of claim 13, wherein the pre-configured amount is a first pre-configured amount, further comprising computer executable instruction, which, when implemented by the computer, cause the computer to perform the steps of updating a number of times the target image is being used by:

recording, when the target image is being used by the current processing request, the number of times the target image is being used; and decreasing, subsequent to the content of the target image corresponding to the current processing request being successfully transmitted to the processor, the number of times the target image is being used by a second pre-configured amount.

15. The computer program product of claim 13, further comprising computer executable instruction, which, when implemented by the computer, cause the computer to perform the steps of updating a number of times the target image is being used by:

in response to a determination that the unique identifier is present in the collection of identifiers, increasing the appearance times of the unique identifier by the pre-configured amount;

setting the appearance times of the unique identifier as the number of times the target image is being used; and decreasing the appearance times of the unique identifier by the pre-configured amount after the content of the target image corresponding to the current processing request is transmitted successfully to the processor.

16. The computer program product of claim 13, wherein the determining of whether the target image is currently being used by the other processing requests further comprises:

determining whether there is a pre-configured indicator associated with the target image; and in response to the determination that there is the pre-configured indicator associated with the target image, determining that the target image is not currently being used by the other processing requests.

17. The computer program product of claim 13, further comprising computer executable instruction, which, when implemented by a computer, cause the computer to perform the steps of:

determining, before obtaining the content of the target image, whether the copy corresponding to the target image is present at the target memory utilized by the target image; and in response to the determination that the copy corresponding to the target image is not present at the target memory, loading the target image into the target memory.

18. The computer program product of claim 13, further comprising computer executable instruction, which, when implemented by the computer, cause the computer to perform the steps of:

determining, before obtaining the content of the target image, whether the copy corresponding to the target image is present at the target memory utilized by the target image;

determining, in response to the determination that the copy corresponding to the target image is not present at the target memory, whether an identifier of the target memory, and/or the current processing request meets one or more pre-configured conditions; and in response to the determination that the identifier of the target memory and/or the current processing request meets the one or more pre-configured conditions, loading the target image into the target memory.

\* \* \* \* \*

UNITED STATES PATENT AND TRADEMARK OFFICE
CERTIFICATE OF CORRECTION

| | | |
|---|---|---|
| PATENT NO. | : 10,679,321 B2 | Page 1 of 1 |
| APPLICATION NO. | : 16/121960 | |
| DATED | : June 9, 2020 | |
| INVENTOR(S) | : Chong Zhang | |

It is certified that error appears in the above-identified patent and that said Letters Patent is hereby corrected as shown below:

In the Claims

In Column 18, Claim 17, Line(s) 23, after "by", delete "a" and insert --the--, therefor.

Signed and Sealed this
First Day of December, 2020

Andrei Iancu
*Director of the United States Patent and Trademark Office*